2,725,190

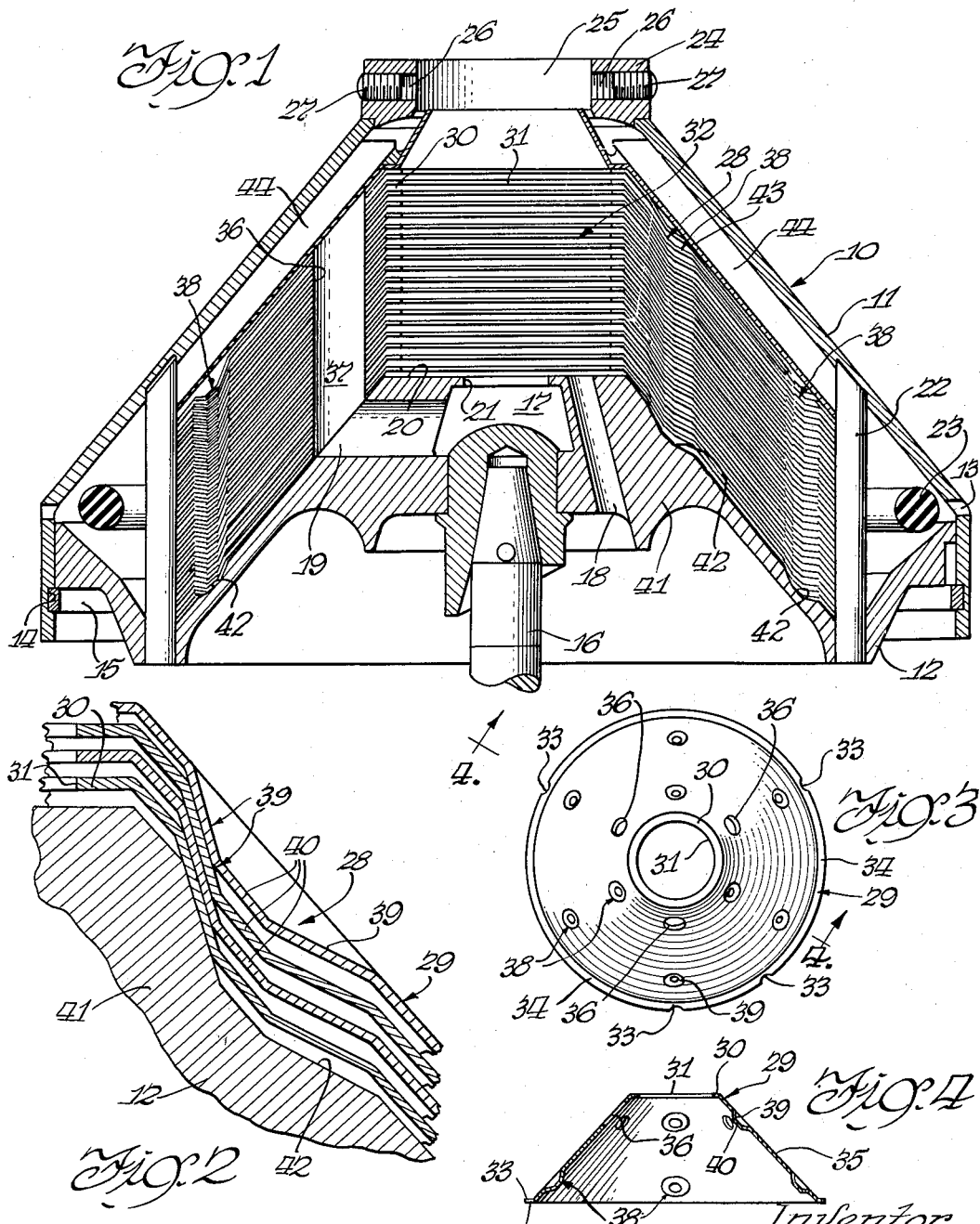

CREAM SEPARATOR DISK ASSEMBLY

Harold W. Hein, Chicago, and William H. Harstick, Oak Park, Ill., assignors to International Harvester Company, a corporation of New Jersey Application April 19, 1954, Serial No. 424,117

1 Claim. (Cl. 233—41)

This invention relates to an improvement in centrifugal separators. More particularly this invention relates to an improved separator disk and disk assembly for cream separators.

In order to secure efficient separation of fluids in a centrifugal separator it is desirable to accurately space the separating disks of the disk stack assembly. The separating disks are generally compacted in superposed relation within the separating bowl. In order to effectively separate the disks with respect to each other it has been customary to weld or solder individual spacer elements or buttons on each disk. In the assembly of the disks with the spacer elements, considerable difficulty has been encountered and the necessity of handling a large number of parts has resulted in extremely high costs in the production of the disks. It is a prime object of this invention therefore to provide an improved separator disk having spacer elements integrally formed during its manufacture.

A still further object is to provide an improved separator disk for cream separators, the disk having a plurality of spacer elements formed in such a manner as to define a projection on the inner surface of the disk and a recess on the outer surface of the disk.

A still further object is to provide a disk stack assembly for separating disks, each disk having a frusto-conical projection with a wall portion effectively adapted to support adjacent disks in accurate vertically spaced assembly.

These and other objects will become more readily apparent from a reading of the specification when examined in connection with the accompanying sheet of drawing.

In the drawing:

Figure 1 is a cross-sectional view in elevation through a power washing cream separator bowl;

Figure 2 is an enlarged fragmentary view of a section of a cream separator bowl showing the cooperation of certain spacer elements on a plurality of separating disks supported within the bowl;

Figure 3 is a plan view of a frusto-conical separating disk; and,

Figure 4 is a cross-sectional view through a separating disk taken along the line 4—4 of Figure 3.

Referring now particularly to Figure 1, a separator bowl is generally designated by the reference character 10. The separator bowl 10 is of the power washing type and includes an upper casing member 11 and a lower casing member 12. In a power washing type of separator, the separating bowl 10 is provided with a peripherally extending discharge opening 13. The opening 13 permits the discharge of washing liquid at a predetermined time for flushing and cleaning the interior of the separating bowl. The upper casing member 11 and the lower casing member 12 are maintained in assembly by means of a recess 14 in which a split ring 15 is positioned. The lower casing member 12 is provided with a drive spindle 16 which may be connected to a suitable electric motor (not shown). The lower casing member 12 is also provided with a distribtuor chamber 17 and a cream discharge bore 18.

The distributor chamber 17 includes a plurality of horizontally extending distributor passages 19. A flat wall 20 is provided on the casing member 12. The flat wall 20 is provided with an opening 21 communicating with the distributor chamber 17. A plurality of circumferentially disposed disk supports 22 are suitably supported on the casing member 12.

The separating bowl 10 is provided with an expansible ring 23 (of rubber or like material) which during high speeds of operation serves to seal the peripheral discharge opening 13. During low speeds of operation wherein it may be desired to wash the interior of the bowl, the expansible ring 23 will contract to the position shown in Figure 1 for permitting the discharge of a washing liquid through the discharge opening 13. The upper casing member 11 is provided with a collar 24 having a central opening 25 leading into the interior of the separating bowl. The collar 24 is provided with skim milk outlets 26 in which regulating screws 27 are positioned in a conventional manner.

Referring now particularly to Figures 1 and 2, a disk pack is generally designated by the reference character 28. The disk pack 28 comprises a plurality of separating disks generally designated at 29. As best shown in Figures 3 and 4 each separating disk 29 includes an annular inwardly extending flat portion or flange 30 and an opening 31. As shown in Figure 1 the disks 29 are stacked in superposed relation with the openings 31 in alignment to provide a liquid receiving space 32 which is in communication with the opening 25. A plurality of cut outs 33 are provided in a lower flange 34 which extends outwardly from the peripheral edge of a frusto-conical body 35. The frusto-conical body 35 includes circumferentially disposed openings 36 which as indicated in Figure 1 are in registry to provide a milk passage 37 in communication with the passage 19.

As best shown in Figures 2, 3 and 4 each separating disk 29 is provided with a plurality of vertically spaced and circumferentially disposed spacer elements 38 formed in the frusto-conical body 35. The spacer elements 38 are integral with the body 35 and may be formed simultaneously during the formation and manufacture of the disks. Each spacer element 38 includes a frusto-conical wall 39 which is provided at its narrow-most portion with a flat circular connecting portion 40 substantially parallel to the outer surface of the body 35. The frusto-conical wall may also be termed as extending inwardly at an angle with respect to the outer surface of the body 35. The disks are all identical and thus the positioning of each spacer element is substantially the same on each disk. The lower casing member 12 is provided with a central hub portion 41 which has a plurality of recesses 42, as shown in Figure 1, the recesses 42 having the same general contour as the spacer elements of the disk.

In assembly the disks are placed in superposed relation within the separating bowl 10. The cut out 33 are so positioned as to engage the disk supports 22 and thus all of the disks are maintained against turning movement. As best shown, in Figure 2, the frusto-conical wall of each of the spacer elements is effective to provide an accurate and effective vertical spacing of one disk with respect to the other. A portion of the wall 39 of one disk has its inner surface engaged by the outer surface of another portion of a wall 39 of another disk in supporting or engaging relation. By varying the angle of the wall 39 it is of course obvious that the relative spacing of the disks may be increased or decreased.

After the disks have been placed in the separating bowl a top divider disk 43 is placed over the disk pack. A plurality of wing members 44 is suitably circumferentially spaced on the inner surface of the casing member 11 and these members engage the separator disk 44 to compress or compact the disk pack in position within the bowl. The engle of the portions 39 permits a limited relative axial movement of the disks so that during compaction the stack is securely held within the bowl with each disk properly spaced relative to the other. Thus the disks 29 are relatively resiliently supported or spaced.

By manufacturing all of the disks in an identical manner accurate spacings of the disks is assured at all times. The integral frusto-conical spacer members may be formed simultaneously with the formation of the disk and thus a relatively inexpensive disk can be produced. By varying the particular shape of the formed spacer element the disk may be varied. Furthermore the arrangement of the frusto-conical wall of each spacer element permits a high degree of compaction within the separating bowl so that the disk pack is effectively supported therein.

Thus it can be seen that the objects of the invention have been fully achieved and it must be understood that changes and modifications may be made without departing from the spirit of the invention as disclosed nor the scope thereof as defined in the appended claim.

What is claimed is:

A centrifugal separator disk assembly comprising a plurality of disks stacked in superposed relation, each disk having a frusto-conical body, a flat portion of said body at one end thereof, said flat portion extending transversely with respect to the axis of said disk and having an opening, means for relatively spacing said disks in axially spaced relation comprising a plurality of disk spacers, disposed on said body in circumferentially and vertically spaced relation, each spacer including a frusto-conical wall, providing a depression on an outer surface of said body and a projection on the inner surface of said body, a circular flat connecting portion on said frusto-conical wall of each spacer, said flat connecting portion extending substantially parallel to the outer surface of the body, the projections of one disk having portions of the frusto-conical walls engaging portions of the frusto-conical walls, forming the depressions, of an adjacent disk.

References Cited in the file of this patent

UNITED STATES PATENTS

| 1,731,999 | Collins | Oct. 15, 1929 |
| 2,012,589 | Miller | Aug. 27, 1935 |
| 2,028,955 | Shenstone | Jan. 28, 1936 |

FOREIGN PATENTS

| 11,927 | Great Britain | 1913 |